United States Patent [19]

Wombwell et al.

[11] Patent Number: 5,900,204
[45] Date of Patent: May 4, 1999

[54] PRODUCTION OF THERMOSET PRESSURE GELATION CASTINGS

[75] Inventors: Paul Terrence Wombwell, Royston; William Walter Charles Badcock, Walden, both of United Kingdom; Marco Lucchi, Allschwil, Switzerland

[73] Assignee: Ciba Specialty Chemicals Corporation, Tarrytown, N.Y.

[21] Appl. No.: 08/894,544

[22] PCT Filed: Mar. 1, 1996

[86] PCT No.: PCT/GB96/00469

§ 371 Date: Aug. 20, 1997

§ 102(e) Date: Aug. 20, 1997

[87] PCT Pub. No.: WO96/27487

PCT Pub. Date: Sep. 12, 1996

[30] Foreign Application Priority Data

Mar. 7, 1995 [GB] United Kingdom .................... 9504564

[51] Int. Cl.⁶ ............................ B29C 35/02; B29C 33/02; B29C 45/73
[52] U.S. Cl. ................. 264/327; 264/328.2; 264/328.15; 264/328.16
[58] Field of Search .................................... 264/327, 40.1, 264/40.6, 328.2, 328.6, 328.14, 328.15, 328.16

[56] References Cited

U.S. PATENT DOCUMENTS 3,777,000 12/1973 Kusenberg et al. ..................... 264/327
5,064,585 11/1991 Cooper et al. .......................... 264/40.6
5,194,197 3/1993 Munk et al. ............................ 264/40.1

FOREIGN PATENT DOCUMENTS 132183 9/1978 Germany .
1323343 7/1973 United Kingdom .
1442041 7/1976 United Kingdom .
9316860 9/1993 WIPO .

OTHER PUBLICATIONS

Derwent Abst. 76–93552X (1976).
Derwent Abst. 88–124216 (1988).
Patent Abstr. of Japan, vol. 12, No. 416, (1988).
Patent Abst. of Japan, vol. 17, No. 623, (1993).

Primary Examiner—Jill L. Heitbrink
Attorney, Agent, or Firm—David R. Crichton; Jacob M. Levine

[57] ABSTRACT

A process for making a cured plastics moulding by introducing a curable resin composition to a heated mould and supplying further resin under pressure to compensate for shrinkage of the composition including heating the curable resin composition either before entry or as quickly as possible on entry into the mould, or both to a temperature which permits the satisfactory filling of the mould before gelation and subsequent progressive gel from the point furthest from entry, back to the point of the mould entry, and wherein the entry parts of the mould are heated to a temperature at least as high as the temperature of the final fill point of the mould.

5 Claims, No Drawings

PRODUCTION OF THERMOSET PRESSURE GELATION CASTINGS

BACKGROUND OF THE INVENTION

The automatic pressure gelation technique (APG) for moulding articles with thermosetting resins is well known and consists essentially of the supply of liquid curable resins under pressure into a mould and ensuring that the pressurised liquid supplied from outside the mould remains in contact with the liquid resin in the mould whilst it gels or solidifies from the furthest point or points from mould entry and or the last point to fill back to the mould entry. By ensuring this applied pressure is maintained on the liquid resin system and the gel progression follows this pattern excellent void and shrinkage free mouldings are obtained by compensating for polymerisation shrinkage with further liquid supplied from the external pressurised source.

This process is well proved in practice for the manufacture of both complex and simple shaped mouldings alike. The process can be used for long production runs of mouldings of high quality with very low rates of rejection. The production of such moulding has been described in Patents EP 0 333 456B1 and U.S. 5,064,585 and in these consists essentially of filling moulds that have temperature within the mould set in the range of from around 120° C. to 160° C. at the point of entry to 130° C. to 170° C. at the furthest point from entry where the furthest point is always the higher and with the ideal temperature at points furthest from resin entry being approximately 10° C. higher than the temperatures at the entry point. Such positive temperature gradients had been stated to be important in order to obtain excellent mouldings from epoxy/anhydride curing compositions which are particularly suited to this process. The temperatures had been chosen to achieve a linear gradient in the moulding operation to ensure the desired gel sequence as stated However, there is a great need to speed this moulding process to achieve the maximum possible use of capital equipment such as moulds and press machines, to reduce labour cost per unit and to approach or to exceed the speed of producing the equivalent item made by thermoplastic injection or dough or sheet moulding compound matched tool moulding. The conditions taught under the patents referenced above do not permit this speed of production with the desired type of resin system.

In order to increase the speed of the process, higher temperatures can be used. However using the known process where a temperature gradient is maintained the temperature gradient at the hotter end of the mould cannot be increased too much as this will result in decomposition of the resin hardener system.

SUMMARY OF THE INVENTION

We have now found that by eliminating the temperature gradient, or even reversing it so that the entry point is at a higher temperature than the furthest point from entry, a decrease in the moulding cycle time can be achieved without decomposition of the resin and without changing the desired gel sequence. The net result is that for any given temperature at the furthest point from entry and for any given resin system, the speed of the process is increased.

Accordingly, the present invention provides a process for making a cured plastics moulding by introducing a curable resin composition to a heated mould and supplying further resin under pressure to compensate for shrinkage of the composition which comprises heating the curable resin composition either before entry or as quickly as possible on entry into the mould, or both, to a temperature which permits the satisfactory filling of the mould before gelation and subsequent progressive gel from the point furthest from entry back to the point of mould entry, and wherein the entry parts of the mould are heated to a temperature at least as high as the temperature of the final fill point of the mould.

The temperatures actually employed may be any which allow the desired sequence of gelation to take place provided degradation of the resin system itself does not occur. Thus for very reactive systems of whatever composition e.g. aliphatic amine cured epoxy resins, acrylic resins, vinyl esters polyurethanes or unsaturated polyesters it could be 100° C.–150° C. or even less, whereas for anhydride cured epoxy resins it might be as high as 200° C. or even higher.

In carrying out the process of the invention the resin system should be heated as quickly as possible to the desired temperatures either before entering the mould or once it has entered a mould tool and left the external feed supply. In a preferred embodiment, the resin composition is supplied to the mould pre-heated to or above the mould temperature at the entry to the mould. To do this the mould temperature nearer to the cooler resin external inlet should be as high as possible, at least as high as, and may be even higher than that furthest away from the inlet. By adopting this approach the resin system is heated on entry as quickly as possible to the desired gelling temperature and maintained close to that temperature as the resin system progresses to the furthest point of the mould or the last to fill which it must reach before gelation commences, whence the gel front moves progressively back to the entry point.

This approach is opposite to all past teaching for such a process as it requires zero or even negative temperature gradients in the mould from the point of entry to the furthest point of the mould or the last to fill.

DETAILED DESCRIPTION OF THE INVENTION

It has also been well documented and long believed that in order to produce mouldings with a cosmetically high definition face it is necessary to heat the section of the mould providing this face to a higher temperature than the section of the mould producing the reverse face. This moulding technique is of general use but particularly so where large or complex mouldings are produced and where cosmetic appearance is of great importance.

We have now found that excellent mouldings can be produced employing the rapid in-mould heating principles of this invention where there is no temperature differential from mould half to corresponding mould half across the moulding regardless of temperature variations within the individual mould halves. In addition, it has been found that by operating with zero or very low temperature differentials across a moulding, particularly those with a relatively low through moulding thickness, very low stress levels are achieved. This is especially evidenced by the production of pressure gelled sheets where zero or low across mould temperature differentials result in essentially unbowed and hence unstressed flat sheets.

Thus the present invention whilst not precluding across moulding temperature differentials does offer the advantages of the rapid production of high quality essentially stress free mouldings when zero or near zero corresponding mould half temperatures differentials are employed. This can be particularly so with both mould halves at a constant temperature but also with a higher temperature near the inlet of the mould tool and a lower temperature at parts furthest from the inlet or the last to fill.

The process of the invention may be used for the production of mouldings having thin or thick walls (cross sections). They are also particularly suitable for the production of mouldings having a large surface area, at least one large linear dimension or a complex shape. The compositions may be used, for instance, in the moulding of domestic sanitary ware such as sinks, baths, shower trays and basins, sheet slabstock for use in the production of articles such as domestic workshops, chemically resistant containers such as tanks and parts such as pumps, valves and pipes for handling corrosive fluids and impact-resistant mouldings for use in cars and other vehicles, and electrical applications.

Anhydride cured epoxy resins have typically been used in the moulding of such diverse items as electrical insulators and domestic hardware, yielding excellent products but with cycle times varying from around 10 minutes to 60 minutes or even longer.

Typically, conventional moulding conditions for castings of section of 1–2 cms thickness or less would comprise a temperature gradient set in the mould of from 140° C.–160° C. at the points of entry up to 150° C.–170° C. at the point furthest from entry. Such conditions would give an in mould cycle of around 9–15 minutes with an epoxy anhydride composition. This is not as fast as thermoplastic injection moulding or some matched tool dough moulded compound (DMC) or sheet moulded compound (SMC) moulding processes.

We have now found surprisingly that by using the process of the invention for fast cycle pressure gelation moulding and reversing the previously held conventions and practices excellent mouldings can be produced in little more than the mould fill time using constant or even negative temperature gradients in the mould from entry to last fill or furthest parts of the mould from entry.

For instance, in EP 0333456B1, the cycle time for making domestic sinks is at least 15 minutes. The actual time depends on the size of the product made. However using the process of the invention and the same epoxy formulations as in the EP specification we have produced kitchen sinks with a total fill, gel and demould cycle of less than 12 minutes, often less than 10 minutes.

The mould gel time may be less than 6 minutes, preferably less than 4 minutes.

Excellent mould cycle times can be achieved with an epoxy anhydride system designed for fast gel at high temperatures with no degradation with mould settings at a constant temperature of from 175° C. to 200° C. or with entry temperatures of 170°–220° C. e.g. 190° C.–200° C. and furthest point from entry temperatures of 170° C.–200° C., e.g. 175° C.

Suitable epoxy resin systems for use in the process of the invention are described in EP 0533465, EP 0599600 and EP 0604089.

Thus, by adopting these techniques which previously would have been thought of as quite unsuitable we have achieved a major advantage in the Pressure Gelation moulding process and can reduce mould cycles to be competitive with every other process for the manufacture of practically similar size and shaped articles where exothermic effects due to excessive wall or bulk thickness do not cause gelation sequence irregularities.

It will be clear to those familiar with the technology that the same non-classical mould temperature settings could be used to achieve the same result for other and more reactive thermosetting systems where lower temperature ranges will be more appropriate.

The invention is illustrated by the following Examples.

EXAMPLE 1

Kitchen sinks are made using an epoxy resin composition containing 100 parts liquid modified bisphenol A epoxy resin with an epoxy content of 5.2 mol/kg, 250 parts finely divided silica, 84 parts of a liquid anhydride hardener and latent accelerators.

The mixture at 50° C. is stirred under vacuum and then injected at 100–250 kPa pressure into the bottom edge of a two-part steel mould providing a shaped cavity of overall height 900 mm, width 600 mm and uniform thickness 0.6 mm having a capacity of about 5.6 litres.

The temperature of the mould is at substantially 175° C. over each half of the mould. The sinks are made with a cycle time of about 6 mins. 20 secs.

EXAMPLE 2

Flat sheets are made using an epoxy resin composition as in Example 1. The mould size is 700×500×6 mm and the injection temperature is 55° C. Both halves of the mould are heated to an entry temperature of 148° C. and the temperature at the point furthest from entry is 146° C.

Flat sheets are obtained with a mould cycle of 5–6 mins and which showed no distortions after a post cure cycle of 3 hours at 135° C.

We claim:

1. A process for making a cured plastics moulding by introducing a curable resin composition into a heated mould and supplying additional curable resin composition into the heated mould under pressure to compensate for shrinkage of the composition, which process comprises heating the curable resin composition before entry into the mould, as quickly as possible upon entry into the mould, or both, to a temperature which permits the satisfactory filling of the mould before gelation and subsequent progressive gelling from the point furthest from entry back to the point of mould entry, and wherein the entry parts of the mould are heated to a temperature at least as high as the temperature of the point furthest from the entry of the mould and in which the resin composition is supplied to the mould preheated to or above the mould temperature at the entry to the mould.

2. A process as claimed in claim 1 in which the curable resin composition is polyester, vinyl ester, acrylic, urethane or epoxy resin.

3. A process as claimed in claim 1 in which the curable resin compositions is an epoxy/anhydride system, the mould temperature at the entry point is from 170° C.–220° C. and the temperature at the final fill point is from 170° C.–200° C.

4. A process as claimed in claim 3, in which the temperature at the entry point is from 190° C.–200° C. and the temperature at the final fill point is 175° C.

5. A process as claimed in claim 3, in which the mould temperature is at a constant temperature of from 175° C.–200° C.

* * * * *